Figures 1, 2:
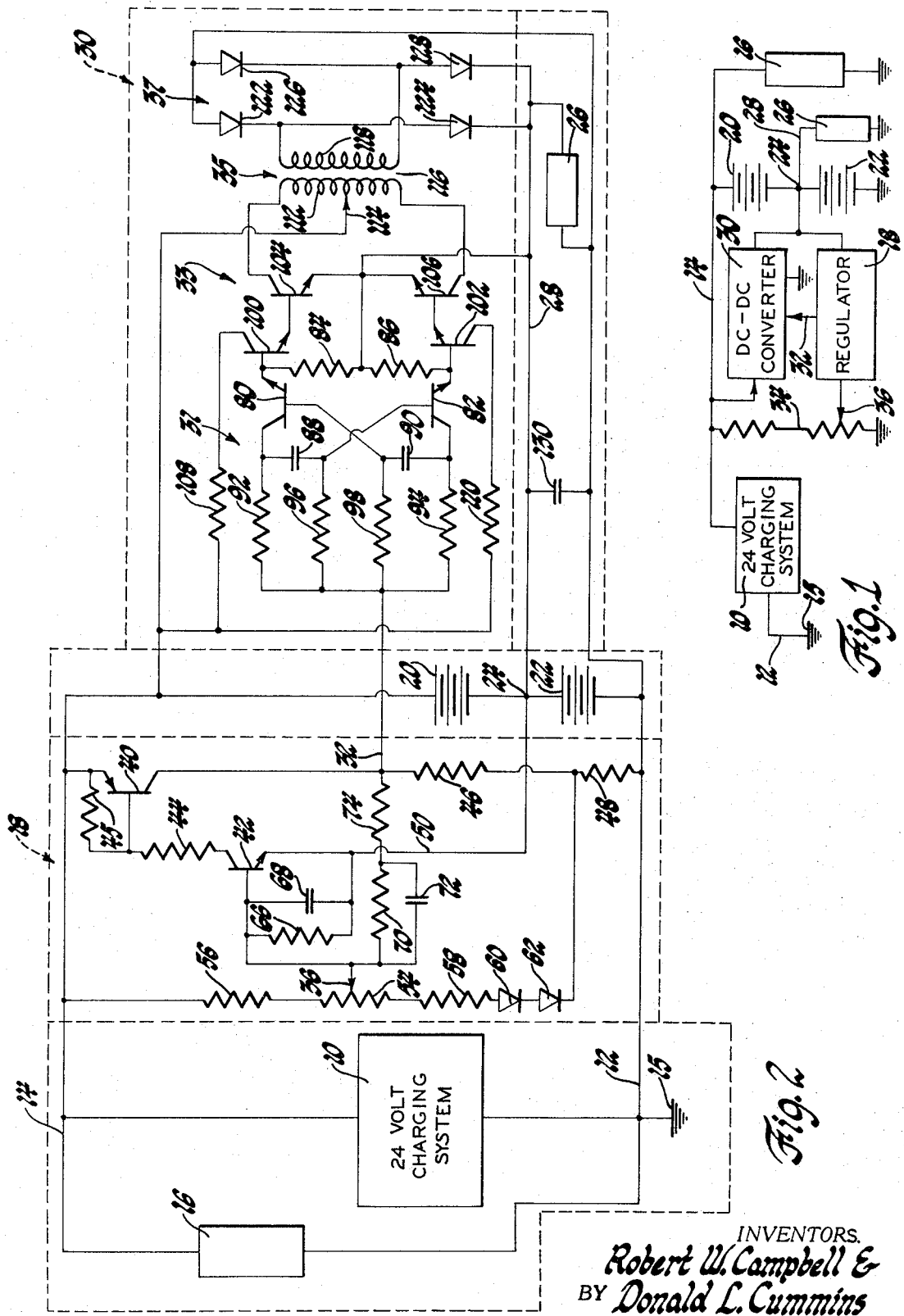

United States Patent
Campbell et al.

[15] 3,667,025
[45] May 30, 1972

[54] DUAL VOLTAGE SYSTEM

[72] Inventors: Robert W. Campbell; Donald L. Cummins, both of Anderson, Ind.

[73] Assignee: General Motors Corporation, Detroit, Mich.

[22] Filed: June 21, 1971

[21] Appl. No.: 154,816

[52] U.S. Cl. ................................................. 320/15, 320/40
[51] Int. Cl. ....................................................... H02j 7/14
[58] Field of Search ................ 320/6, 15, 17, 39, 40; 323/15

[56] References Cited

UNITED STATES PATENTS

| | | | |
|---|---|---|---|
| 3,413,536 | 11/1968 | Webb | 320/40 X |
| 3,440,514 | 4/1969 | Fenley | 320/6 |
| 3,463,995 | 8/1969 | Herold | 320/6 |
| 3,493,837 | 2/1970 | Sparks et al. | 320/40 X |

Primary Examiner—A. D. Pellinen
Attorney—E. W. Christen et al.

[57] ABSTRACT

Two 12–volt batteries are connected in series across the output of a 24–volt charging system, and a DC to DC converter is connected between the output of the charging system and a junction between the batteries. To maintain equal voltages across both batteries, the voltage at the junction is compared with a reference voltage by a voltage regulator that is operatively connected with a DC to DC converter to maintain a regulated output therefrom to the junction.

4 Claims, 2 Drawing Figures

Fig. 2

Patented May 30, 1972

3,667,025

INVENTORS.
Robert W. Campbell &
BY Donald L. Cummins
Albert H. Duke
ATTORNEY

DUAL VOLTAGE SYSTEM

This invention relates to a vehicle charging system providing higher and lower simultaneously regulated outputs respectively to two equal voltage batteries connected in series and having means for controlling the lower regulated output to maintain equal voltages across the batteries.

It is often desirable to operate some vehicle electrical apparatus at a higher voltage than other apparatus. For example, in certain truck applications where the starting torque is high, suitable starting power may be obtained from two 12-volt batteries connected in series while the remaining electrical accessories such as lights are supplied from just one of the 12-volt batteries. Both batteries could be charged in series from the output of a single 24-volt charging system connected across both batteries. However, with such charging in series, means must be provided to avoid overcharging either of the batteries. Such protection is important, regardless of whether the charging system is operative or not, anytime the battery voltages are unbalanced, as for example when the parking lights of a truck are supplied by just one battery with the truck engine and charging system either on or off. Charging both batteries in series after such a use risks overcharging the battery which hasn't been discharged with the current required to charge the battery which has been discharged.

The complexity of prior art solutions to charging batteries in series makes it more desirable to prevent the unequal discharge of the batteries in the first place. This approach, moreover, affords the additional significant advantage that more reserve starting power would be available if the energy required to supply the loads connected across one of the batteries were drawn equally from both batteries rather than from just one battery.

However, to maintain equal voltages across both batteries while the loads being supplied are connected across just one, requires both that the voltage across the one battery be detected relative to that across the other and that the means for maintaining the voltages equal are operative both when the engine of the vehicle runs to operate the charging system and when it does not.

It is therefore a primary object of the present invention to provide means for maintaining the voltage at a junction between series-connected batteries at a predetermined proportion of the voltage across both batteries.

It is another object of the present invention to maintain the voltage at the junction of batteries connected in series across the output of a charging system at a predetermined reference voltage by means of a voltage regulator that compares the junction and reference voltages and controls a DC to DC converter connected between the output of the charging system and the junction.

It is a further and more specific object of the present invention to maintain the voltage at the junction between series-connected batteries at a reference voltage obtained from a voltage divider across both batteries by means of a voltage regulator that compares the junction and reference voltages and that controls a DC to DC converter connected across one of the batteries.

These and other objects are obtained in the present invention by means of a pair of 12-volt batteries connected in series across the output of a 24-volt charging system and a DC to DC converter, the input to which is connected across one of the batteries and the output of which is connected across the other. The output of the DC to DC converter is maintained at half the voltage across both batteries by means of a voltage divider providing a reference voltage representing half of the voltage across both batteries. A voltage regulator compares the voltage at the junction of the batteries with the reference voltage and controls the DC to DC converter to maintain the reference voltage at the junction.

Further objects, advantages, and details of the present invention will become apparent from the following description taken in conjunction with the drawings wherein:

FIG. 1 is a block diagram of a circuit for maintaining equal voltages across two series-connected batteries in accordance with the present invention; and FIG. 2 shows the block diagram of FIG. 1 in schematic form.

With reference now to FIG. 1, there is shown a conventional charging system 10 having an output of 24 volts regulated by a voltage regulator (not shown). The output of system 10 is connected between DC load conductors 12 and 14, conductor 12 being connected to a point of constant reference potential, here ground 15 and conductor 14 carrying the system voltage. Also connected between DC load conductors 12 and 14 are a 24-volt load in the form of starting motor 16, a voltage regulator 18, and two 12-volt series-connected batteries 20 and 22. These batteries define a junction 24 therebetween connected to a 12-volt load in the form of lamps 26 by a conductor 28. Connected across battery 20 with its input connected to system voltage load conductor 14 and its output connected to junction 24 is a DC to DC converter 30 that receives control voltages on control conductor 32 from regulator 18. Also connected across batteries 20 and 22 is a voltage divider 34 having a tap 36 adjusted to represent half of the voltage across batteries 20 and 22. Voltage regulator 18 compares the voltages at junction 24 and tap 36 and controls converter 30 via control conductor 32 to maintain the reference voltage at the junction.

As may be seen in greater detail with reference to FIG. 2, voltage regulator 18 is comprised of a PNP transistor 40 and an NPN transistor 42. So that conduction of transistor 40 may be controlled by transistor 42, the base of the former is connected to the collector of the latter through resistor 44, and a bias resistor 45 connected between the emitter and base electrodes of transistor 40 aids the turn-off thereof with the turnoff of transistor 42. To sense the voltage across battery 22 relative to that across both batteries 20 and 22, transistor 42 has its emitter connected to junction 24 through sense conductor 50 and its base connected to wiper 36 of potentiometer 54. To comprises a voltage divider connected across batteries 20 and 22 by load conductors 12 and 14, potentiometer 54 is connected in series with divider resistors 56 and 58, diodes 60 and 62 for temperature compensation of the transistor, and a pullup resistor 48 functioning as described below.

Wiper 36 is adjusted so that the reference voltage provided thereat and the voltage at junction 24 bear the same relation, here one-half, to the system voltage on load conductor 14 when batteries 20 and 22 are equally charged. Since the voltage across voltage dividing resistors 48, 56 and 58 and temperature compensating diodes 60 and 62 is the same as that across batteries 20 and 22 regardless of the individual or relative charge states of these batteries, the reference voltage at wiper 36 may change as the voltage across batteries 20 and 22 changes but will still be a constant percentage, here 50 percent of the system voltage on conductor 14 across both batteries.

Should the voltage on battery 22 momentarily drop to be less than that across battery 20, as might be occasioned by a heavy drain by loads 26, the sense voltage at junction 24 would drop relative to the reference voltage on wiper 36 by an amount proportional to the difference between the voltages across both batteries. This difference indicates that the sense voltage at junction 24 is momentarily a lower percentage of the system voltage on conductor 14 then the reference voltage on wiper 36 and results in the base voltage of transistor 42 being raised sufficiently above the emitter voltage thereof to render transistor 42 conductive and in turn also transistor 40. When transistor 40 is rendered conductive, the collector voltage thereof is raised across resistor 46 and coupled to DC to DC converter 30, causing the latter to produce an output on conductor 28, tending to raise the sense voltage at junction 24 to where transistors 42 and 40 are cut off.

Voltage regulator 18 also comprises components to effect filtering of transients on conductor 28 to prevent losses in DC to DC converter 30 to provide hysteresis between the turnon and turn-off voltages for converter 30 and to cause converter 30 to provide a greater output for greater differences between the voltages at junction 24 and tap 36. Since DC to DC converter 30 is comprised of switching transistors that provide switching transients on conductor 28, it is necessary to isolate the operation of regulator 18 from the effects of such switching transients. This is effected by the connection of a filter in the form of a resistor 66 and a capacitor 68 connected in parallel between the emitter and base electrodes of NPN transistor 42. To avoid losses in DC to DC converter 30, it is necessary to switch the transistors therein at a constant frequency, since this frequency is dependent on the magnitude of the supply voltage on conductor 32, it is necessary to obtain a constant voltage on conductor 32 promptly upon turn-on of regulator 18. This is effected through feedback resistor 74 connected between the collector of transistor 40 and the base of transistor 42.

Connected in series with resistor 74 as a part of this feedback to the base of transistor 42 is a filter in the form of resistor 70 connected in parallel with capacitor 72. The purpose of this filter is to provide a minimum time delay between the turn-on and turn-off of converter 30 during which battery 22 may be charged from the output of converter 30. Such delay is necessary since the higher terminal voltage on battery 22 when being charged than when not being charged would otherwise cause regulator 18 to turn off converter 30 immediately after turn on.

The charge rate to battery 22 is determined by the period during which converter 30 is on and this period in turn is determined by the difference between the sense voltage at junction 24 and the reference voltage at tap 36. Therefore, the charge rate from converter 30 to battery 22 may be increased by amplifying the actual difference between the sense and reference voltages by an amount proportional to the actual difference. This is effected by pullup resistor 48 connecting the collector circuit of transistor 40 with the base circuit of transistor 42. Since transistor 40 conducts more heavily with increasing differences between the sense and reference voltages, the drop across resistor 48 increases accordingly. The voltage at tap 36 will therefore be artificially increased by the amount of the increased drop across resistor 48.

DC to DC converter is comprised of a multivibrator input stage 31, a push-pull driver stage 33 switched thereby, a transformer 35 fed by driver stage 33, and a full-wave bridge rectifier 37 fed by transformer 35. Multivibrator 31 is representative of the conventional multivibrator, the natural frequency of which is determined by the supply voltage on control conductor 32 when the transistor 40 is rendered conductive, as hereinabove discussed. Multivibrator 31 is comprised of switching transistors 80 and 82, the emitters of which are connected to 12–volt load conductor 28 respectively through resistors 84 and 86, and the collectors of which are connected to conductor 32 respectively through resistors 92 and 94. The collector of transistor 80 is coupled by capacitor 88 to the base of transistor 82 and the collector of transistor 82 is similarly coupled to the base of transistor 80 by capacitor 90. With a suitable bias applied to the bases of transistors 80 and 82 through conductor 32 and resistors 96 and 98 respectively, initial imbalance in the circuit causes one of the transistors to be conductive and the other non-conductive. Assuming transistor 80 to be initially conductive, capacitor 88 then charges through resistor 96 and thereby increases the base drive on complementary transistor 82 to initiate conduction therethrough. The resulting lowered collector potential thereof is coupled to the base of transistor 80 through capacitor 90 thereby decreasing conduction therethrough and increasing the collector voltage thereof. The increasing collector voltage on transistor 80 is fed back to the base of transistor 82 by capacitor 88 thereby regeneratively aiding the turn on of transistor 82 and the turn off of transistor 80. Thereafter, capacitor 90 charges through resistor 98 to turn transistor 80 on and transistor 82 off and the cycle repeats, causing the switching of driver stage 33 at the same rate.

Driver stage 33 is comprised of signal transistors 100 and 102, the collectors of which are connected to 24–volt line 14 respectively through resistors 108 and 110, the bases of which are connected to the emitters of multivibrator transistors 80 and 82, and the emitters of which are respectively connected to drive transistors 104 and 106. The emitters of drive transistors 104 and 106 are commonly connected to the 12–volt line 28 and the collectors are connected to the 24-volt line 14 through primary winding 112 and center tap 114 thereof of a 10:13 step up transformer 35. The ends of secondary 118 of transformer 35 are connected to different legs of full wave bridge rectifier 37 comprised of diodes 122, 124, 126 and 128. When drive transistor 104 is rendered conductive in response to the conduction of multivibrator transistor 80 and the resulting conduction of signal transistor 100, a current path is completed from 24–volt line 14 to 12–volt line 28 through center tap 114 and one-half of primary 112 of transformer 116 and through transistor 104. The resulting AC signals developed by the switching of drive transistors 104 and 106 in response to the switching of multivibrator transistors 80 and 82 are coupled through the secondary winding 118 of transformer 35 to the AC input terminals full-wave bridge rectifier 37 having DC output terminals connected to 12–volt line 28 and ground 15 and across capacitor 130.

The output developed by rectifier 37 is available both to supply 12–volt loads 26 and to charge 12–volt battery 22. Such charging of battery 22 and supplying of loads 26 obtains, whether 24–volt charging system is operative or not, as long as the voltage across battery 20 is greater than that across battery 22. In other words, voltage regulator 18, multivibrator 31 and driver 33 may be energized either from the output of 24–volt charging system 10, when active, or from the battery 20 when not active. In either condition, regulator 18 is operative to maintain a desired proportion, here one-half, between the terminal voltage of battery 22 and the terminal voltage of both batteries 20 and 22 in series. This is effected by causing converter 30 to charge battery 22 until the voltages on the base and emitter of transistor 42 bear the same relationship to the voltage across batteries 20 and 22.

The following is a table of representative values of components that may be used to construct and operate the circuit shown in the drawing and discussed above.

| Resistors (ohms) | Capacitors |
|---|---|
| 44 470, ½ watt | 68 0.005 mfd, 50 V |
| 45 1 K, ¼ watt | 72 0.10 mfd, 50 V |
| 46 100 K, ½ watt | 88 0.18 mfd, 50 V |
| 48 1.8 K, ½ watt | 90 0.18 mfd, 50 V |
| 54 0–2.5 K, 1 watt | 130 80 mfd, 20 VDC |
| 56 5.4 K, ½ watt | Transformer 10:13 |
| 58 3.9 K, ½ watt | |
| 66 4.7 K, ½ watt | |
| 70 30 K, ½ watt | |
| 74 10 K, ½ watt | Diodes |
| 84 470, ½ watt | 60 1N4002 |
| 86 470, ½ watt | 62 1N4002 |
| 92 180, ½ watt | 122 1N 3660–R |
| 94 180, ½ watt | 124 1N3660 |
| 96 4.7 K, ¼ watt | 126 1N3660–R |
| 98 4.7 K, ¼ watt | 128 1N3660 |
| 108 5, 20 watt | |
| 110 5, 20 watt | |

Having described one embodiment of the present invention, it is understood that the specific terms and examples are employed in a descriptive sense only and not for the purpose of limitation. Other embodiments of the invention, modification thereof, and alternatives thereto may be used. We therefore aim in the appended claims to cover such modification and changes as fall within the true spirit and scope of our invention.

What we claim is new and desire to secure by Letters Patent of the United States is:

1. In a vehicle electrical system:
   a. first and second DC load conductors, said second load conductor connected to a point of constant reference potential;
   b. direct voltage generating means connected between said first and second DC load conductors;
   c. first and second batteries connected in series between said first and second DC load conductors and defining a junction therebetween having a voltage thereat;

d. an electrical load circuit connected in parallel with said second battery between said junction and said second conductor means;

e. DC to DC converter means having input, output, and control terminals, said input terminals connected across said first battery and said output terminals connected across said second battery, said converter operable to charge said second battery from either said first battery or said generator; and f. voltage regulator means connected between said junction and control terminals, said voltage regulator means responsive to the voltage at said junction and operative to cause said converter to maintain said voltage at said junction at a predetermined proportion of the voltage between said first and second DC load conductors.

2. In a vehicle electrical system having a generator connected between first and second DC load conductors, said second DC load conductor being connected to a point of constant reference potential, first and second equal voltage batteries connected in series between said first and second DC load conductors and defining a junction therebetween having a sense voltage thereat, a first load connected across said first and second batteries and a second load connected across said second battery, means for maintaining equal voltages across both said batteries comprising:

a. DC to DC converter means comprising oscillator, transformer and rectifier means, the input to said converter means connected across said first battery and the output of said converter means connected to said second battery, said converter means operable to charge said second battery from either said first battery or said generator;

b. voltage divider means connected between said first and second DC load conductors and having a tap therebetween for providing a reference voltage, said reference voltage being a predetermined proportion of the voltage at said first DC load conductor; and c. voltage regulator means for controlling the output of said converter at said reference voltage, said regulator comprising a first transistor and a second transistor, said first transistor connected between said junction and tap and controlled by differences in the voltages thereat and said second transistor connected between said first DC load conductor and said converter means and controlled by said first transistor, said first and second transistors being rendered conductive when said sense voltage at said junction is less than said reference voltage at said tap and being rendered non-conductive when said voltages are substantially the same, whereby said conduction and non-conduction of said second transistor maintains the output of said DC to DC converter at said reference voltage.

3. A power supply system for a motor vehicle comprising:

a. first and second load conductors, b. a direct voltage generating means having output terminals connected with said first and second conductor means, c. first and second series connected batteries connected across said first and second conductor means and having a junction located therebetween, d. an electrical load circuit connected in parallel with said second battery between said junction and said second conductor means, e. a voltage divider means connected across said batteries having a junction, the ratio of voltage division provided by said voltage divider means being the same as the ratio of the nominal terminal voltages of said batteries whereby the voltage at said voltage divider junction is substantially the same as the voltage at said junction between said batteries when both of said batteries are charged to said nominal voltages, f. power transfer means having an input connected across said first battery and an output connected across said second battery; and g. means for causing said power transfer means to supply energy to said second battery from said first battery when the voltage at said voltage divider junction exceeds the voltage at said battery junction by a predetermined amount whereby the voltages applied to said batteries are substantially equalized during operation of said system.

4. In a vehicle electrical system having a generator connected between first and second DC load conductors, said second load conductor being connected to a point of constant reference potential, a. first and second batteries connected in series between said first and second DC load conductors and defining a junction therebetween;

b. means for maintaining voltage at said junction at a predetermined portion of the voltage between said first and second DC load conductors comprising:

i. DC to DC converter means having input, output and control terminals, said input terminals connected across said first battery and said output terminals connected across said second battery, said converter operable to charge said second battery from either said first battery or said generator;

ii. voltage divider means connected between said first and second DC load conductors and having a tap therebetween for providing a reference voltage, said reference voltage being said predetermined proportion of the voltage between said first and second DC load conductors; and iii. voltage regulator means connected between said tap, junction, and control terminal of said converter, said voltage regulator means operative to maintain the output of said converter at said predetermined proportion.

* * * * *